US 8,037,408 B2

(12) United States Patent
Hartmann

(10) Patent No.: US 8,037,408 B2
(45) Date of Patent: Oct. 11, 2011

(54) SYSTEMS AND METHODS OF VALIDATING TEMPLATES

(75) Inventor: Falk Hartmann, Dresden (DE)

(73) Assignee: SAP AG, Walldorf (DE)

( * ) Notice: Subject to any disclaimer, the term of this patent is extended or adjusted under 35 U.S.C. 154(b) by 1135 days.

(21) Appl. No.: 11/315,891

(22) Filed: Dec. 22, 2005

(65) Prior Publication Data

US 2007/0150806 A1   Jun. 28, 2007

(51) Int. Cl.
  *G06F 17/27* (2006.01)
(52) U.S. Cl. ...................................................... 715/237
(58) Field of Classification Search .................... 715/237
  See application file for complete search history.

(56) References Cited

U.S. PATENT DOCUMENTS

| | | | |
|---|---|---|---|
| 6,763,500 B2 * | 7/2004 | Black et al. | 715/234 |
| 7,281,018 B1 * | 10/2007 | Begun et al. | 707/102 |
| 2002/0169803 A1 * | 11/2002 | Sampath et al. | 707/513 |
| 2003/0069975 A1 * | 4/2003 | Abjanic et al. | 709/227 |
| 2003/0070142 A1 * | 4/2003 | Drake et al. | 715/513 |
| 2003/0097637 A1 * | 5/2003 | Tozawa et al. | 715/513 |
| 2004/0006744 A1 * | 1/2004 | Jones et al. | 715/514 |
| 2004/0139095 A1 * | 7/2004 | Trastour et al. | 707/100 |
| 2004/0205573 A1 * | 10/2004 | Carlson et al. | 715/513 |
| 2005/0060645 A1 * | 3/2005 | Raghavachari et al. | 715/513 |
| 2005/0262115 A1 * | 11/2005 | Hu et al. | 707/100 |
| 2005/0289517 A1 * | 12/2005 | Balfe et al. | 717/126 |
| 2006/0167905 A1 * | 7/2006 | Liu et al. | 707/100 |
| 2007/0078875 A1 * | 4/2007 | Kothari et al. | 707/101 |

FOREIGN PATENT DOCUMENTS

WO   WO 03081457 A1 * 10/2003

OTHER PUBLICATIONS

Nentwich et al., Flexible Consistency Checking, Jan. 2003, ACM Transactions on Software Engineering and Methodology, vol. 12, No. 1, pp. 31-35.*
Marinelli et al., SchemaPath a Minimal Extension to XML Schema for Conditional Constraints, May 17-22, 2004, ACM WWW 2004 New York, pp. 164-174.*
Badros, The Extensible Templating Language: An XML-Based Restricted Markup-Generating Language, 2003, ACM WWW2003, pp. 1-10.*
Brabrand et al., Static Validation of Dynamically Generated HTML, 2001, ACM Paste '01, pp. 1-8.*
Jacinto et al., XCSL: XML Constraint Specification Language, 2004, CLEI Electronic Journal, vol. 6, No. 1, pp. 1-29. Retrieved from http://www.clei.cl/cleiej/papers/v6i1p3.pdf.*
Eder et al., Composition of Transformations for XML Schema Based Documents, p. 1-10 (Proceedings of Short Papers of the 7th East European Conference on Advances in Databased and Information Systems, 2003).*

(Continued)

*Primary Examiner* — Laurie Ries
*Assistant Examiner* — Frank D Mills
(74) *Attorney, Agent, or Firm* — Fountainhead Law Group PC

(57) ABSTRACT

Embodiments of the present invention provide systems and methods of validating templates. One embodiment the present invention includes a computer-implemented method validating a template comprising receiving a target language schema, receiving a placeholder schema, generating a template schema that is based on the target schema and the placeholder schema, and validating the template against the template schema. If the template conforms to the template schema and if the template is instantiated, the instantiated template will conform to the target language schema.

17 Claims, 11 Drawing Sheets

OTHER PUBLICATIONS

Marinelli et al., Schemapath, A Minimal Extension to XML Schema for Conditional Constraints, p. 1.11 (ACM, WWW 2004, New York, New York, 2004).*

XSL Transformations (XSLT) Version 1.0, p. 1-77 (W3C Recommendation Nov. 16, 1999), retrieved from http://www.w3.org/TR/1999/REC-xslt-19991166.html on Apr. 22, 2011.*

Greg J. Badros, "The Extensible Templating Language", URL:http://www.badros.com/greg/papers/etl-www2003.pdf, Nov. 2002.

Falk Hartmann, "An Architecture for an XML-Template Engine Enabling Safe Authoring", 17th Intern'l Conference on Database and Expert Systems Applications, Sep. 4, 2006.

Claus Brabrand et al, "Static Validation of Dynamically Generated HTML", Workshop on Program Analysis for Software Tools and Engineering, Jun. 18, 2001, Snowbird, Utah, USA.

Donald Smith, "Understanding W3C Schema Complex Types", URL: http://www.xml.com/1pt/a/833, Aug. 22, 2001.

Kohlbecker et al, "Hygienic Macro Expansion", Proceedings of the 1986 ACM Conference on Lisp and Functional Programming, Aug. 4, 1986, Cambridge, MA, USA.

Eugen C. Nistor, "Using Domain Models in Extensible Schema-based Software Synthesis," NASA Ames Research Center, Technical Report 2004.

Christian Nentwich, Wolfgang Emmerich, Anthony Finkelstein, and Ernst Ellmer, "Flexible Consistency Checking," ACM Transactions on Software Engineering and Methodology, vol. 12, No. 1, Jan. 2003, pp. 28-63.

* cited by examiner

400

```
Receive a target language schema in schema
compiler
401
```
↓
```
Receive a placeholder language schema in
schema compiler
402
```
↓
```
Generate a template schema based on target
language schema and placeholder schema
403
```
↓
```
Receive the template schema in template
validator
404
```
↓
```
Receive a template in template validator
405
```
↓
```
Validate the template against the template
schema
406
```

*FIG. 4*

```
<?xml version="1.0" encoding="UTF-8"?>
<xsd:schema xmlns:xsd="http://www.w3.org/2001/XMLSchema">
    <xsd:element name="address" type="address"/>

<xsd:complexType name="address">
        <xsd:sequence>
            <xsd:element name="name" type="xsd:string"/>
            <xsd:element name="first-name" type="xsd:string"/>
            <xsd:element name="street" type="xsd:string"/>
            <xsd:element name="zip" type="xsd:decimal"/>
            <xsd:element name="city" type="xsd:string"/>
            <xsd:element name="country" type="country"/>
            <xsd:element name="comments" minOccurs="0">
                <xsd:complexType>
                    <xsd:sequence>
                        <xsd:element name="comment" type="xsd:string" minOccurs="1" maxOccurs="unbounded"/>
                    </xsd:sequence>
                </xsd:complexType>
            </xsd:element>
        </xsd:sequence>
    </xsd:complexType>

<xsd:complexType name="country">
        <xsd:simpleContent>
            <xsd:extension base="xsd:string">
                <xsd:attribute name="iso-code" type="xsd:string" use="required"/>
            </xsd:extension>
        </xsd:simpleContent>
    </xsd:complexType>

</xsd:schema>
```

*FIG. 5*

```xml
<?xml version="1.0" encoding="ISO-8859-1"?>
<xs:schema
    targetNamespace="http://research.sap.com/xtl/1.0"
    xmlns:xs="http://www.w3.org/2001/XMLSchema"
    xmlns:xtl="http://research.sap.com/xtl/1.0"
    xmlns:html="http://www.w3.org/1999/xhtml"
>
    <xs:annotation>
        <xs:documentation>
            This is the documentation for the XTL schema. This schema is not intended
            to be directly used by some application author. Instead, it is used by the
            XTL schema transformer to create a
                <html:a name="templschema"><html:b>template language schema</html:b></html:a>
                from a so-called
                <html:a name="targetschema"><html:b>target language schema</html:b></html:a>.
        </xs:documentation>
    </xs:annotation>

<xs:element name="attribute" type="xtl:attribute">
        <xs:annotation>
            <xs:documentation>
                This element can be used to create attributes at its surrounding
                element.
            </xs:documentation>
        </xs:annotation>
    </xs:element>
```

*FIG. 6A*

```
<xs:complexType name="attribute">
    <xs:annotation>
        <xs:documentation>
            <html:p>
                Elements of this type can be used to create attributes at its
                surrounding element.
            </html:p>
            <html:p>
                If the attribute was defined to be "required"
                in the <html:a href="#targetschema">target language schema</html:a>, it will
                be transformed to be optional in the <html:a href="#templschema">template
                language schema</html:a> and <html:i>either</html:i> an
                appropriate XTL:attribute element <html:i>or</html:i> the attribute itself
                must be present.
            </html:p>
            <html:p>
                If it was optional, an appropriate XTL:attribute <html:i>or</html:i>
                the attribute itself must be present - in case that both are present,
                a non-null result of the XTL:attribute will take precedence, i.e., the value
                directly defined at the element can be considered as the default in the case,
                that the XTL:attribute element doesn't yield a non-null result.
            </html:p>
        </xs:documentation>
    </xs:annotation>
    <xs:attribute name="name" use="required" type="xs:string">
        <xs:annotation>
            <xs:documentation>
                The name of the attribuet to be created.
            </xs:documentation>
        </xs:annotation>
    </xs:attribute>
    <xs:attributeGroup ref="xtl:select"/>
</xs:complexType>
```

*FIG. 6B*

```
<xs:element name="text" type="xtl:text">
    <xs:annotation>
        <xs:documentation>
            This element can be used to create text content.
        </xs:documentation>
    </xs:annotation>
</xs:element>
<xs:complexType name="text">
    <xs:annotation>
        <xs:documentation>
            <html:p>
                An element of this type will be replaced by text during template
                instantiation.
            </html:p>
            <html:p>
                If the content model of the surrounding element is simple, the
                content model will be transformed into a complex model that allows
                embedding of <html:i>either</html:i> exactly one XTL:text element
                <html:i>or</html:i> text complying to the original simple content model.
            </html:p>
            <html:p>
                If the content model of the surrounding element is complex (with
                mixed content allowed), the content model will be extended to
                allow the inclusion of zero or more XTL:text elements.
            </html:p>
        </xs:documentation>
    </xs:annotation>
    <xs:attributeGroup ref="xtl:select"/>
</xs:complexType>
```

*FIG. 6C*

```
<xs:attribute name="if" type="xs:string">
    <xs:annotation>
        <xs:documentation>
            An element with this attribute attached will only be included
            in the template instantiation result, if its value evaluates
            by the template engine to <html:code>true</html:code>.
        </xs:documentation>
    </xs:annotation>
</xs:attribute>

<xs:attribute name="for-each" type="xs:string">
    <xs:annotation>
        <xs:documentation>
            An element with this attribute attached will be included multiple
            times in the template instantiation result. The value should be used
            by the template engine to evaluate a collection; for each of its items,
            the element is inserted into the instantiation result.
        </xs:documentation>
    </xs:annotation>
</xs:attribute>
```

FIG. 6D

```
<xs:attributeGroup name="select">
    <xs:annotation>
        <xs:documentation>
            This attribute group defines a select attribute that
            allows the binding of node content to be created to expressions
            evaluated within the template engine.
        </xs:documentation>
    </xs:annotation>
    <xs:attribute name="select" use="required" type="xs:string">
        <xs:annotation>
            <xs:documentation>
                The select attribute tells the XTL engine, how the
                values for node to be created can be retrieved.
                The exact meaning of the value of this attribute is beyond
                the scope of the XTL language definition, i.e., the definition
                of the semantics of this attribute is up to the template engine.
            </xs:documentation>
        </xs:annotation>
    </xs:attribute>
</xs:attributeGroup>
</xs:schema>
```

*FIG. 6E*

```xml
<?xml version="1.0" encoding="UTF-8" ?>
```

- `<address xmlns:xsi="http://www.w3.org/2001/XMLSchema-instance" xmlns:xtl="http://research.sap.com/xtl/1.0" xsi:schemaLocation="http://research.sap.com/xtl/1.0 XTL.xsd" xsi:noNamespaceSchemaLocation="Address.xsd">`

`<name>Mustermann</name>`

`<first-name>Max</first-name>`

`<street>Musterstrasse</street>`

`<zip>1199</zip>`

- `<city>`

`<xtl:text select="getCity()" />`

`</city>`

- `<country>`

`<xtl:attribute name="iso-code" select="getIsoCode()" />`

Germany

`</country>`

- `<comments>`

`<comment xtl:if="isSample()">This is a sample address</comment>`

`<comment xtl:if="isSample()">Don't use for shipping!</comment>`

- `<comment xtl:for-each="getComments()">`

`<xtl:text select="getComment()" />`

`</comment>`

`</comments>`

`</address>`

*FIG. 7*

SYSTEMS AND METHODS OF VALIDATING TEMPLATES

BACKGROUND

The present invention relates to validating templates, and in particular, to ensuring that an instantiated template will conform to a target language.

A markup language is a system for managing information and is used to code the information in a document by adding structure and metadata (i.e., information about data) to the document. Hypertext Markup Language (HTML) is an example of a widely used markup language. HTML is a specific language with its own vocabulary of tags and is used to establish the appearance and layout of a document as displayed in a browser. While HTML is simple to use, HTML tags are primarily formatting-oriented and do not provide information about the content of a document. This makes it cumbersome to reuse information in another context. Extensible Markup Language (XML) is another widely used markup language, which is designed to better handle the task of managing information. XML is more like a meta-language, which provides the grammar for developing custom markup languages, each with its own vocabulary. This is what makes XML "extensible," and what makes XML so useful across a wide range of domains. Custom markup languages are sometimes referred to as XML applications or XML-based languages.

A wide number of tools use templates and template engines to transform data from one format to another. Extensible Stylesheet Language—Transformation (XSLT) is an example of such a tool. XSLT can, for example, create summary and full versions of the same document or convert a document from XML to HTML. Template-based transformations are ubiquitous in the software development world. Such a transformation process involves a template that organizes data. A template has placeholders (i.e., internal references) that stand in the place of content or data, which is not yet known or identified. In other words, placeholders denote incomplete portions within a template. During the transformation process (also referred to as instantiation), a template engine extracts data (also referred to as instantiation data) from a database or memory location and replaces the placeholders of the template with the data. The template engine produces a document (also referred to as an instantiated template) that is formatted in the target language.

A problem with conventional methods of instantiation is that the instantiated template needs to follow a set of rules that govern how the data is to be represented and organized. In other words, the instantiated template needs to conform to the target language, where descriptive tags are standard and uniform, and the data associated with the tags has a predictable format or range of values. If the instantiated template does not conform to the target language, applications written for the target language cannot properly process the document.

Target languages are typically defined by rules, or constraints, that govern the target language using what is referred to as a schema. The schema, also referred to as the target language schema, defines the target language by specifying the structure of the document: which elements and attributes are allowed, not allowed, or even required in the target language document. Document Type Definition (DTD) and XML Schema are examples of widely used schemas.

Conventional template engines are not able to ensure that an instantiated template will conform to the target language schema. Instantiated templates may be checked after the instantiation process, but such checking is error-prone (as the test might not include the instantiation data that leads to an error) and time consuming (if one tries to figure out whether the template or the instantiation data is causing the problem).

Thus, there is a need for improving the instantiation of templates. The present invention solves these and other problems by providing systems and methods of validating templates.

SUMMARY

Embodiments of the present invention include systems and methods for validating templates. In one embodiment, the present invention includes a computer-implemented method validating a template comprising receiving a target language schema, receiving a placeholder schema, generating a template schema that is based on the target schema and the placeholder schema, and validating the template against the template schema. For example, if the template conforms to the template schema and if the template is instantiated, the instantiated template will conform to the target language schema.

In one embodiment, validating occurs before the template is instantiated.

In one embodiment, the template schema is an XML schema.

In one embodiment, the XML schema is enhanced using an object constraint language.

In one embodiment, the target language schema contains constraints, and all of the constraints of the target schema are preserved in the template schema.

In one embodiment, generating the template schema comprises transforming simple types into complex types.

In another embodiment, the present invention includes a computer system including software for validating a template, the software comprising a schema compiler for generating a template schema based on a target language schema and a placeholder schema, a template validator for validating the template against the template schema, and a template engine for instantiating a template.

Embodiments of the invention may be implemented on a computer-readable medium containing instructions for controlling a computer system to perform a method validating a template.

The following detailed description and accompanying drawings provide a better understanding of the nature and advantages of the present invention.

BRIEF DESCRIPTION OF THE DRAWINGS

FIG. 4 illustrates a method according to one embodiment of the present invention.

FIG. 5 is an example of a target language schema according to one embodiment of the present invention.

FIGS. 6A-6E are an example of a placeholder schema according to one embodiment of the present invention.

FIG. 7 is an example of a template according to one embodiment of the present invention.

DETAILED DESCRIPTION

Described herein are techniques for validating templates. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
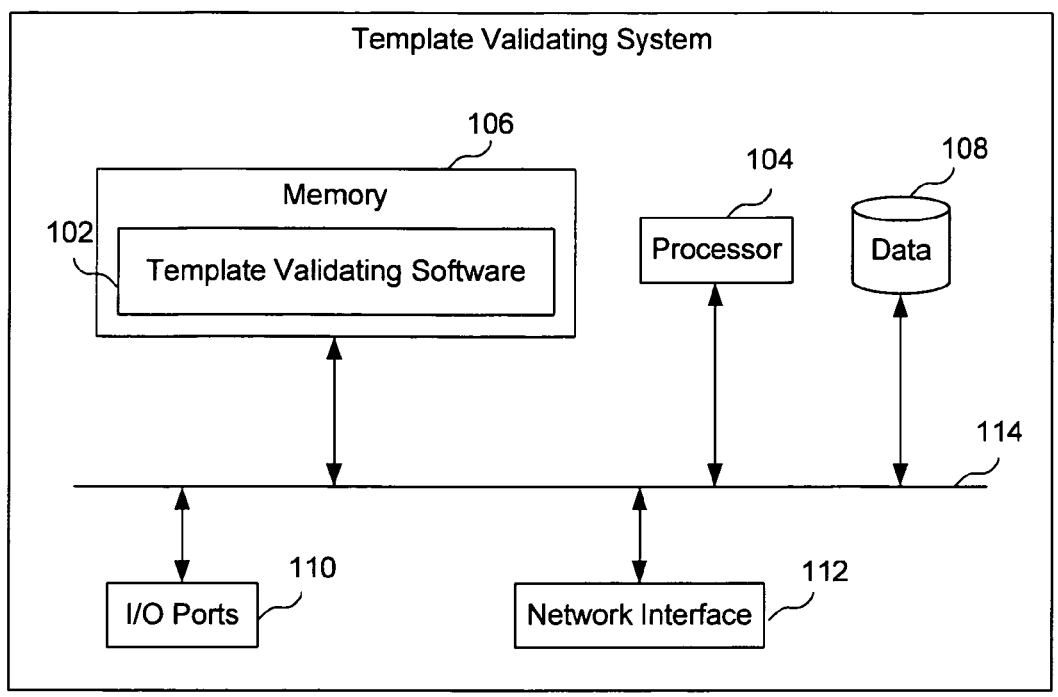
FIG. 1 illustrates a computer system including template validation software according to one embodiment of the present invention.

FIG. 1 illustrates a computer system 100 including template validation software 102 according to one embodiment of the present invention. Embodiments of the present invention validate a template to ensure that an instantiated template to be generated from an instantiation of the template will conform to a target language schema before the template is actually instantiated. According to one aspect of the present invention, computer system 100 may include template validating software 102 executed on a processor 104 and stored in a memory 106. Memory 106 may include one or more non-volatile storage devices (e.g., a hard disk storage device) and one or more volatile storage devices (e.g., random access memory (RAM)). Computer system 100 may also include a database 108, input/output (I/O) ports 110, and a network interface 112. In one embodiment, a monitor or other display device (not shown) for displaying a user interface may be coupled to the computer system 100 via I/O ports 110. The components of the computer system 100 are operatively coupled with a system bus 114.

Figure 2:
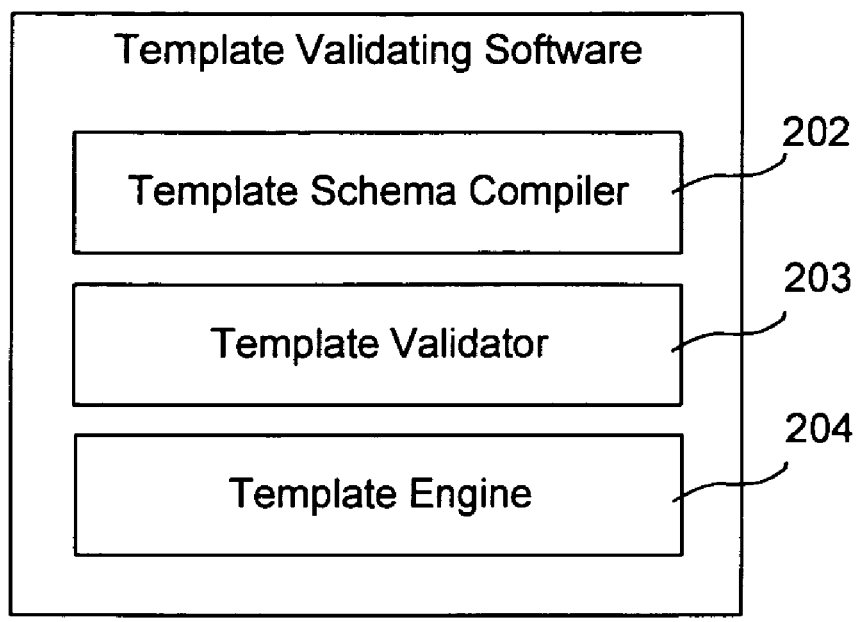
FIG. 2 illustrates a computer software system for validating a template according to one embodiment of the present invention.

FIG. 2 illustrates a computer software system 200 for validating a template according to one embodiment of the present invention. Computer software system 200 may be executed on a microprocessor based system, for example, and stored on a hard drive, local memory, or other computer-readable medium containing instructions for controlling a computer system to perform the methods described herein. In one embodiment, computer system software 200 includes a template schema compiler 202, a template validator 203, and a template engine 204. In one implementation, template schema compiler 202 may generate a template schema against which a template may be validated. The template validator 203 validates the template against the template schema. Template engine 204 instantiates the template. Embodiments of the present invention ensure that an instantiated template to be generated will conform to a target language schema. This is accomplished by validating the template against a template schema, which is generated based on a target language schema and a placeholder language schema described below. Although the present invention disclosed herein is described in the context of XML, the present invention may apply to other languages, and still remain within the spirit and scope of the present invention.

Figure 3:
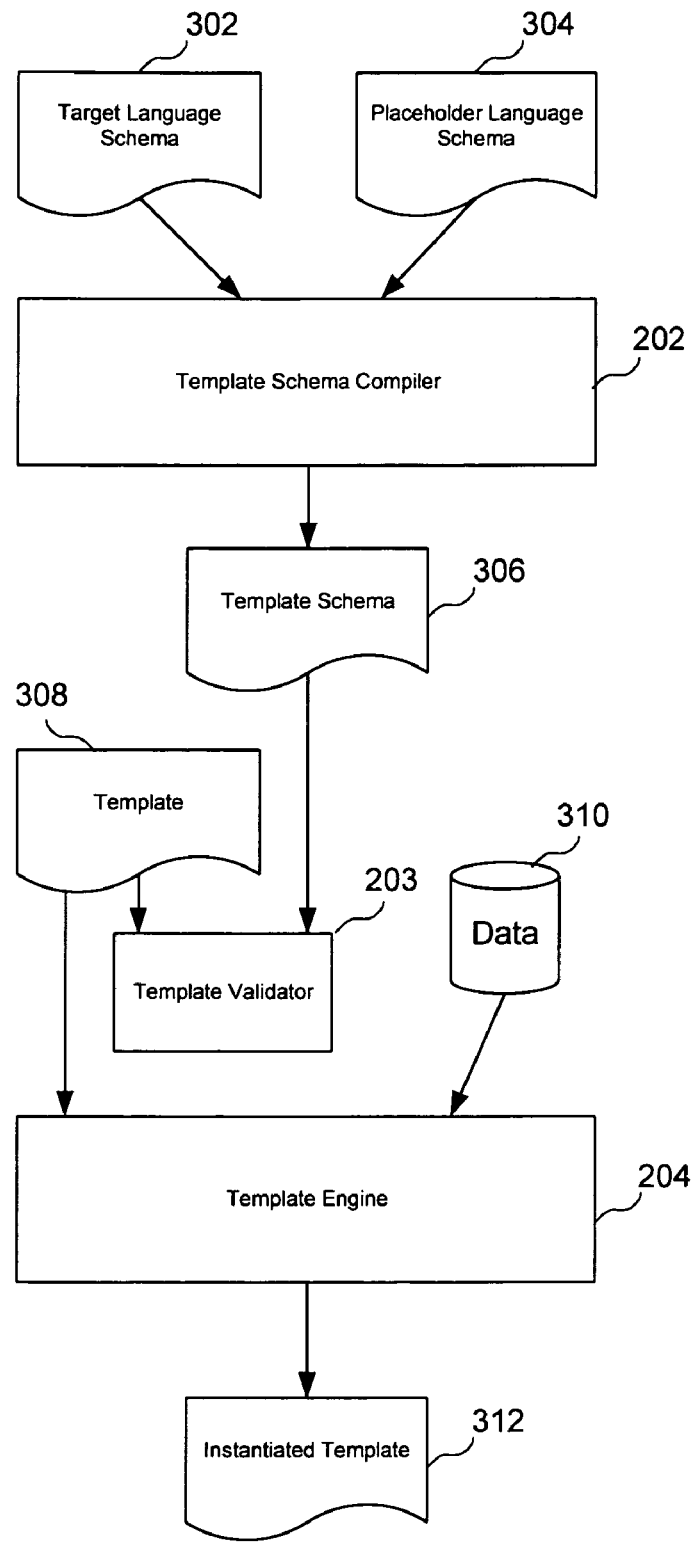
FIG. 3 illustrates template validation according to one embodiment of the present invention.

FIG. 3 illustrates a process flow 300 in association with template schema compiler 202, template validator 203, and template engine 204 (FIG. 2) according to one embodiment of the present invention. In operation, template schema compiler 202 receives a target language schema 302 and a placeholder language schema 304. A target language schema defines the target language by specifying the structure of the document: which elements and attributes are allowed, not allowed, or even required in the instantiated template, etc. More specifically, the target language schema may specify which elements are child elements of others, the sequence in which the child elements can appear, the number of child elements, and/or whether an element is empty or can include text. A target language schema may also define which tags may be used in a document, which tags and attributes those tags can contain, default values for attributes, and numerous other rules regarding structure, content, and semantics. A placeholder language schema defines the placeholder language by specifying the structure, syntax, and semantics and other constraints for the placeholders of the template.

Template schema compiler 202 generates a template schema 306 based on target language schema 302 and placeholder language schema 304. Template validator 203 receives template schema 306 and a template 308. A template 308 may then be validated using template schema 306, which includes information about both the target language schema and placeholder schema. The validated template may then be provided to the template engine, which will access the instantiation data and generate a document.

The instantiated template may not conform to the target language schema for two reasons. The first reason is that the template itself may contain a structural flaw or a data type flaw. The second reason is that the data that is used to replace the placeholders may not be type-correct (i.e., of the correct data type that is prescribed by the target language schema). Accordingly, if the structure of the template is flawed or the data is not type-correct, an instantiation of the template would result in an instantiated template that does not conform to the target language schema. Conventional validation procedures for instantiated templates are error-prone due to poor test coverage. For example, if an error occurs due to a problem with the template, the cause of problem cannot be identified. In other words, there is no means to determine whether the problem is associated with the data or with the template.

In accordance with the present invention, these problems are addressed by validating the template against the template schema before the template is instantiated. Since the template schema is based on both the target language schema and the placeholder language schema, the template schema provides sufficiently precise rules regarding structure, content, and semantics to properly validate a template before it is instantiated. As such, if the template conforms to the template schema, the resulting instantiated template will conform to the target language schema.

The template compiler generates the template schema according to certain principles. One principle involves the preservation of target language schema constraints. As described above, the target language schema contains constraints that are imposed on the instantiation template. When the template compiler generates the template schema, all of the constraints of the target language schema are preserved in the template schema. This ensures that compliance of the template with the template language schema is a sufficient condition for the instantiation template to be compliant with the target language schema. In one embodiment, every constraint imposed by the target language schema is preserved within the template language schema. In this case, an expressive schema is preferably used for the template language schema (i.e., a schema containing sufficiently expressed constraints) to ensure preservation because in some schema languages, such as XML schema, some of the constraints may not be expressible, which may violate the desirable principle of preservation. In one embodiment, a schema language may be enhanced using a constrain language. For example, in one embodiment XML schema may be enhanced using object constraint language ("OCL"). A specific example is provided below.

Another principle involves the coverage of the target language. The template engine uses the template to produce valid instantiated template. In one embodiment, every valid instantiated template is producible using a template. In this case, the structural components of the document are part of the template, and the non-structural components (e.g., the content) of the instantiated template may be stored in the instantiation data or in the template itself.

Another principle involves content control. As described above, the placeholder language schema contains constraints (e.g., syntax) for the placeholders in the template. This allows the content of the instantiated template to be controlled by supporting a mechanism for the conditional inclusion and the repetition of document parts. Examples of such constraints are described in detail below.

As FIG. 3 illustrates, the process flow 300 ensures that if template 308 is valid (i.e., conforms to template schema 306), an instantiated template 312 will be properly structured and valid (i.e., conforms to target language schema 302). In other words, instantiated template 312 would be validated using various schemas (e.g., Document Type Definition (DTD), XML Schema, TrEX, Schematron, etc.).

FIG. 4 illustrates a method 400 of validating a template according to one embodiment of the present invention. At 401, the template schema compiler receives a target language schema. FIG. 5 is an example of a target language schema according to one embodiment of the present invention. At 402, the template schema compiler receives a placeholder language schema. FIGS. 6A-E are an example of a placeholder schema according to one embodiment of the present invention. At 403, the template schema compiler generates a template schema based on the target language schema and placeholder schema. At 404, the template validator receives the template schema generated at 403. At 405, the template validator receives a template. FIG. 7 is an example of a template according to one embodiment of the present invention. At 406, the template is validated against the template schema. The validation of the template ensures that the template, if instantiated, will produce a document that conforms to the target language schema. This validation occurs before an actual instantiation of the template.

The following example illustrates one implementation of an embodiment of the present invention. First, example schema language definitions are provided. Next, an example algorithm for generating a template language schema is illustrated.

A. EXAMPLE SCHEMA LANGUAGE DEFINITIONS

In this section, an all-purpose XML template language ("XTL") will be exemplarily defined to illustrate the algorithm defined later. This definition includes a set of constraints to be fulfilled by a placeholder language that should allow upfront checking of the template instantiation results. In addition to this, some optional features are described which will greatly enhance the acceptance of the template language.

The introduced features of XTL may bind the placeholders to names that are evaluated by the template engine during the instantiation process. These names may be completely opaque to the template engine, i.e., the definition of XTL may not make any assumptions about the semantics of these names.

The language schema described in this example has features, some of which are requirements (e.g., the ability to include attribute values and text within an element), some of which are optional (e.g., the ability to include conditional content and looping), and some of which are less desired (e.g., the creation of arbitrary elements). Exemplary implementations of these constraints are described below.

One required feature is to allow the XML template to include attribute values (i.e., the extraction of actual attribute values into code using the template engine). In one implementation, XTL uses a special syntax within the attribute value (e.g., "$PLACEHOLDER$"). This implementation may involve encoding a placeholder symbol (e.g., "$"). This implementation may also involve a relaxing a data type used to declare the attribute in the schema (e.g., from an integer or from a Boolean to a string). In another implementation, XTL uses a special tag as a sub-element of the tag that should receive the attribute. This implementation may involve enforcing some relaxations of the attribute necessity and of the declaring elements content model. When special tags are used, XTL may define an xtl:attribute tag.

Another required feature is to allow the XML template to include attribute text within an element. In one implementation, XTL uses a special syntax within the element, like "$PLACEHOLDER$." In another implementation, XTL uses a special tag that is embedded into the element content. In both cases, the content model of an element, in which the text should be placed, may be relaxed to allow either the special placeholder syntax or the special tag. XTL uses a special tag by defining an xtl:text tag.

One optional feature is to allow the XML template to optionally include conditional content within a template, where such an inclusion may depend on a condition that the template engine evaluates. In one implementation, XTL determines how many branches are embedded in a conditional construct. For example, one branch may correspond to the classic if . . . then construct, two branches may correspond to the if . . . then . . . else construct, and more branches may correspond to the switch construct in languages like C or Java. In another implementation, XTL may determine multiple branches to be selected. This is true for the switch construct and false for the if . . . then . . . else construct in the languages mentioned above. Because of the assumed opacity of the conditions, it is preferred to allow exactly zero or one branch to be selected by the design of the placeholder language. This minimizes a possible disadvantage of allowing multiple branches to be included, where a complete validation of the content model of the surrounding element would not be possible without considering the conditions of the branches.

The syntax of the XML template language may use elements or attributes to implement the conditional content features. Using attributes may be slightly less powerful than using elements, as the use of attributes greatly simplifies the handling of "white space" (e.g., spaces, tabs, blank lines, etc.) compared to using elements. Also, any disadvantage of using attributes can be compensated by using an attribute multiple times on different elements. XTL defines an xtl:if attribute, which may be used to mark a single element to be included or excluded during an instantiation, depending on a condition that the template engine evaluates.

Another optional feature is to allow the XML template to optionally include looping features, which allows content to be included repeatedly within the XTL template in the instantiation result. XTL defines an xtl:for-each attribute, which can be used to mark a single element to be repeated as many times as the attribute value indicates.

A feature that is less desirable is the creation of arbitrary elements. It is not optimal to create an arbitrary element using XTL, because template engines are intended to support the "separation of concerns" design principle. Separation of concerns is the process of breaking a program into distinct features that overlap in functionality as little as possible. Arbitrary elements would violate the separation of concerns principle. Furthermore, upfront validation (i.e., validation before instantiation) would be sub-optimal with arbitrary elements, because there could be no guarantees about the eventual instantiation result. Furthermore, the introduction of a construct like XSLT's choose, which allows the selection of zero or more alternatives is strongly discouraged. Such a feature may be used in very limited situations without lowering the guarantees of the upfront validation.

B. EXAMPLE SCHEMA COMPILATION

The following describes one implementation where a target language schema (e.g., XML schema) is to be transformed, or compiled, into a template schema that can be used for upfront validation of a template. Note that the transformation process described below does not affect the number and names of the declared data types and elements in the target language schema. Also, if a document conforms to the target language schema, then the document will also conform to the template schema. The only difference is that the namespace is different.

In the following example, it is assumed that no attributes or element groups are declared within the template schema, because these features can be removed by in-lining their content into places to where they are referred. Furthermore, no attention is given to anonymous type definitions, because they may be considered top-level definitions.

The compilation of the template schema generates two types of constraints: an upfront constraint and an instantiation constraint. The upfront constraint is imposed upon the template during validation of the template before an instantiation. The instantiation constraint is imposed upon the template during an instantiation. If the expressive power of XML schema is insufficient to ensure a valid instantiation result, additional upfront constraints are shown. If there are constraints on data used to fill the placeholders, the constraints are shown as instantiation constraints. All constraints are themselves templates in that they contain placeholders (e.g., displayed as "name of the element") that refer to the text that describes the constraint.

The language that states the constraints is a combination of object constraint language (OCL) and XPath language. The context of an upfront constraint is some node within an XML instance, while the context of an instantiation constraint is a virtual operation (e.g., named evaluatePlaceholder). Upfront constraints are invariants while instantiation constraints are post conditions on the virtual operation.

Upfront constraints are shown within the context of the schema, but upfront constraints are not shown within the context of a document instance. For example, an upfront constraint might exist within the context of a data type definition. In this case, the constraint checking is performed based on a post schema validation infoset (PSVI) attached to the document instance by the template schema compiler.

It is assumed that the component evaluating the OCL constraint (in some compiled form) has access to the target language schema. A virtual method isValid-Literal has been used in the constraints that allows checking as to whether a certain value is a valid literal with respect to some type given by its qualified name. In one implementation, the upfront constraints may be directly evaluated after the schema validation, and the instantiation constraints may be translated into some programming language used to implement the template engine.

The following sections describe the processing of particular exemplary XML schema constructs.

B.1. Schema

At the schema level, the target namespace may be changed in order to allow extended data types to be distinguished from the template language schema and the original types as declared by the target language schema. In the examples that follow, the new target namespace is denoted by the prefix tns, and the target language schema namespace is denoted by the prefix ons. The template schema does not import the target language schema. Instead, all elements of the target language schema are transformed into the template language schema. If a given element is not transformed, the element is copied. In one implementation, schema elements may be processed by multiple rules. If so, the invocation of the second processing rule is indicated explicitly.

In the template schema, at the schema element, only the targetNamespace attribute and the namespace assignments of additional prefixes targeting the same namespace are changed:

```
<schema targetNamespace="http://www.example.org"
    xmlns:tns=="http://www.example.org">
    <!-- Any content. -->
</schema>
<schema targetNamespace="http://www.example.org"
    xmlns:tns=="http://www.example.org">
    <!-- Any content. -->
</schema>
```

With regard to upfront constraints, in one implementation, no additional upfront constraints are defined for the schema element. With regard to instantiation constraints, in one implementation, for evaluations of the xtl:if attribute and the xtl:for-each attribute, the following constraints apply, as the value of the first attribute evaluate to a Boolean and the value of the second attribute evaluate to a Collection:

context evaluatePlaceholder(currentElement: Element): Object
    post:
        name(currentElement)=xtl:if implies
        result.oclIsKindOf(Boolean)
    context evaluatePlaceholder(currentElement: Element): Object
    post:
        name(currentElement)=xtl:for-each implies
        result.oclIsKindOf(Collection)

B.2. Simple Type

During the transformation process, in one implementation, simple types are transformed into complex types in order to enable the embedding of the xtl:text element:

```
<simpleType name="b">
    <!-- Any content. -->
</ simpleType >
<complexType name="b" mixed="true">
    <sequence>
        <element ref="xtl:text" minOccurs="0" maxOccurs="1"/>
    </sequence>
</complexType>
```

With regard to upfront constraints, in one implementation, either optional white space and the xtl:text element or content complying to the original simple type are in place. This is assured by the following constraint:

context element complying to the complex type
    inv:

(self->select(xtl:text)->size( ) = 1 implies
        self->select(text( )[normalize-space(.)!=""])->size( ) = 0)

```
        or
    self->select(text( )).isValidLiteral(ons:type name)
```

With regard to instantiation constraints, in one implementation, the template compiler checks to ensure that the data used to replace the xtl:text element complies with the type as defined by the original type declaration:

context evaluatePlaceholder(currentElement: Element): Object
    post:
        currentElement=element complying to the complex type/xtl:text implies
        result.isValidLiteral(ons:type name)

B.3. Complex Type

In one implementation, the template schema compiler may alter a complex type in multiple ways, basically, an xtl:attribute and/or an xtl:text element might have to be allowed as content of the elements referring to the type. In addition, required attributes declared by the type may be relaxed (e.g., made optional) in order to allow them to be set exclusively by an xtl:attribute element. The processing of a complex type definition depends on the content of the definition in the schema.

B.3.a. Complex Type with Simple Content

With regard to the template schema, the type declaration is transformed into a complex type declaration with the following properties:

The mixed attribute is set to true, thereby allowing unconstrained text content.
    The content of the complex type element in the transformed schema is a sequence.
    The sequence allows zero or one xtl:text element.

```
<complexType name="b">
    <simpleContent>
        <!-- This might be an extension, too. -->
        <restriction base="tns:a">
            <maxInclusive value="9999"/>
        </restriction>
    </simpleContent>
</complexType>
<complexType name="b" mixed="true">
    <sequence>
        <element ref="xtl:text" minOccurs="0" maxOccurs="1"/>
    </sequence>
</complexType>
```

With regard to upfront constraints, in one implementation, the upfront constraint introduced by simple types (see above) must also hold here. With regard to instantiation constraints, the template compiler checks to ensure that data used to replace the xtl:text element complies to the type as defined by the original type declaration—the constraint is exactly the same as the one described in the Simple Type section above.

B.3.b. Complex Type with Non-Mixed Complex Content

With regard to template schema, in one implementation, because complex types with complex content always derive their content model from another complex type, the content model of these complex types is only changed when the base type is the xs:anyType. If the base type is within the schema currently being transformed (or if an external schema defining the base type has been enabled for use with XTL), the content model will already allow the use of xtl:attribute.

The transformation depends on the content of the xs:complexContent element. Two cases are possible: a sequence or a choice, and all. With sequence or choice, if the complex content is defined to be a sequence or a choice, a sequence is wrapped around it:

```
<complexType name="b">
    <complexContent>
        <!-- This might be a restriction, too. -->
        <extension base="xs:anyType">
            <!-- Might be a sequence, too. -->
            <choice>
                <!-- Content of the choice -->
            </choice>
        </extension>
    </complexContent>
</complexType>
<complexType name="b">
    <complexContent>
        <!-- This might be a restriction, too. -->
        <extension base="xs:anyType">
            <sequence>
                <element ref="xtl:attribute"
                    minOccurs="0" maxOccurs="unbounded"/>
                <choice>
                    <!-- Content of the choice -->
                </choice>
            </sequence>
        </extension>
    </complexContent>
</complexType>
```

With an all case, if the complex content is defined using xs:all, the transformation can only approximate a sequence of xtl:attribute followed by the original xs:all construct by using a xs:sequence containing xs:choice:

```
<complexType name="b">
    <complexContent>
        <!-- This might be a restriction, too. -->
        <extension base="xs:anyType">
            <all>
                <element name="el1" type="ty1"/>
                <element name="el2" type="ty2"/>
                <!-- More elements here. -->
            </all>
        </extension>
    </complexContent>
</complexType>
<complexType name="b">
    <complexContent>
        <!-- This might be a restriction, too. -->
        <extension base="xs:anyType">
            <sequence>
                <element ref="xtl:attribute"
                    minOccurs="0" maxOccurs="unbounded"/>
                <sequence>
                    <choice>
                        <element name="el1" type="ty1"/>
                        <element name="el2" type="ty2"/>
                        <!-- More elements here. -->
                    </choice>
                </sequence>
            </sequence>
        </extension>
    </complexContent>
</complexType>
```

With regard to upfront constraints, in one implementation, in the all case as defined above, an additional constraint is used to assert the equivalence between the sequence of choices that the xs:all constraint has been transformed into. The following constraint states that the elements in the type, that are not xtl:attribute elements have unique qualified names, which is, together with the size of this collection, asserting that each element appears exactly once.

context element complying to the complex type
inv:

```
self->reject(.[xtl:attribute or text( )])->isUnique(name( ))
    and
(self->reject(.[xtl:attribute or text( )])->size( ) =
    number of elements in xs:all)
```

If the complex type is derived from a complex type with mixed content within this schema, the allowance of xtl:text must be revoked. This is ensured with the following constraint:

context element complying to the complex type
inv:
    self->select(xtl:text)->size( )=0

With regard to instantiation constraints, in one implementation, as a restriction or an extension of a complex type might change the type of values (in a restricting or extending way), the constraints for an attribute value evaluated by the template engine change:

context evaluatePlaceholder(currentElement: Element): Object
post:
    currentElement=element complying to the complex type/xtl:attribute[@name='attribute name'] implies result.isValidLiteral(ons:type name)

B.3.c. Complex Type with Mixed Complex Content

With regard to the template schema, in complex types with mixed content, the use of xtl:text has to be allowed in order to create text content. Because complex types with mixed content must always be derived from a base type which also has mixed content, the allowance of the xtl:text element will only be done on complex types based on xs:anyType. After all the transformations described below, the complex content model still must be enabled for the use of xtl:attribute as described in the section "Complex type with non-mixed complex content" above.

The actual transformation depends on the content model. In a sequence case, the elements inside the sequence are interleaved with xtl:text elements:

```
<complexType name="b" mixed="true">
    <complexContent>
        <restriction base="anyType">
            <sequence>
                <element name="a" type="integer"/>
                <element name="b" type="integer"/>
            </sequence>
        </restriction>
    </complexContent>
</complexType>
<complexType name="b" mixed="true">
    <complexContent>
        <restriction base="anyType">
            <sequence>
                <element name="text" type="string"/>
                <element name="a" type="integer"/>
                <element name="text" type="string"/>
                <element name="b" type="integer"/>
                <element name="text" type="string"/>
            </sequence>
        </restriction>
    </complexContent>
</complexType>
```

In a choice case, the choice is be wrapped by a sequence allowing xtl:text elements around the choice itself. Please note that the minOccurs and maxOccurs attributes have moved from the choice to the enclosing sequence:

```
<complexType name="b" mixed="true">
    <complexContent>
        <restriction base="anyType">
            <choice minOccurs="0" maxOccurs="3">
                <element name="a" type="integer"/>
                <element name="b" type="integer"/>
            </choice>
        </restriction>
    </complexContent>
</complexType>
<complexType name="b" mixed="true">
    <complexContent>
        <restriction base="anyType">
            <sequence minOccurs="0" maxOccurs="3">
                <element name="text" type="string" />
                <choice minOccurs="1" maxOccurs="1">
                    <element name="a" type="integer"/>
                    <element name="b" type="integer"/>
                </choice>
                <element name="text" type="string"/>
            </sequence>
        </restriction>
    </complexContent>
</complexType>
```

In an all case, as described above for non-mixed complex content, an all element must be replaced by a sequence of choices:

```
<complexType name="b" mixed="true">
    <complexContent>
        <!-- This might be a restriction, too. -->
        <extension base="xs:anyType">
            <all>
                <element name="el1" type="ty1"/>
                <element name="el2" type="ty2"/>
                <!-- More elements here. -->
            </all>
        </extension>
    </complexContent>
</complexType>
<complexType name="b" mixed="true">
    <complexContent>
        <!-- This might be a restriction, too. -->
        <extension base="xs:anyType">
            <sequence>
                <choice>
                    <element ref="xtl:text"/>
                    <element name="el1" type="ty1"/>
                    <element name="el2" type="ty2"/>
                    <!-- More elements here. -->
                </choice>
            </sequence>
        </extension>
    </complexContent>
</complexType>
```

With regard to upfront constraints, in one implementation, with an all case, as defined above, an additional constraint is needed to assert the equivalence between the sequence of choices that the xs:all constraint has been transformed into. The following constraint states that the elements in the type that are not xtl:text elements have unique qualified names, which is, together with the size of this collection, asserting that each element appears exactly once.

context element complying to the complex type
inv:

```
self->reject(.[xtl:text or text( )])->isUnique(name( ))
    and
(self->reject(.[xtl:text or text( )])->size( ) =
    number of elements in xs:all)
```

With regard to instantiation constraints, in one implementation, the instantiation constraints are identical to the constraints given in the section "Complex type with non-mixed complex content".

B.4. Element

With regard to the template schema, all element declarations need to be changed by allowing the attributes xtl:if and xtl:for-each to be attached to them. The first attribute, xtl:if is allowed if and only if the element declaration has a minOccurs attribute of zero and a maxOccurs attribute of one (implicitly or explicitly). The second attribute, xtl:for-each is allowed if and only if the element declaration has a minOccurs attribute of zero and a maxOccurs of unbounded. This can be achieved using an anonymous type declaration as follows:

```
<complexType name="b">
    <!-- any content -->
    <element name="el1" type="ty1"
            minOccurs="0" maxOccurs="unbounded"/>
    <!-- any content -->
</complexType>
<complexType name="b">
    <!-- any content -->
    <element name="el1" minOccurs="0" maxOccurs="unbounded">
        <complexType>
            <!-- Might be simpleContent, too. -->
            <complexContent>
                <extension base="tns:choi">
                    <attribute ref="xtl:for-each"/>
                </extension>
            </complexContent>
        </complexType>
    </element>
    <!-- any content -->
</complexType>
```

Note that while the anonymous type will always be a complex type, its content might also be simple for simple base types.

With regard to upfront constraints, in one implementation, the root element in a template is not allowed to carry an xtl:if or xtl:for-each attribute, as a valid instantiation must always have exactly one root element, too. This is asserted by the following constraint:

context/
inv:
   self->select(@xtl:if or @xtl:for-each)->size( )=0

B.5. Attribute

With regard to the template schema, in one implementation, as the transformation of attributes requires the allowance of xtl:attribute in the complex type carrying the attribute, top-level attribute declarations will not be processed. This allowance process has already been described above. All required attributes are set to be optional by the transformation process to allow the attribute to be set by using the xtl:attribute element:

```
<complexType name="b">
    <!-- any content -->
    <attribute name="a" type="string" use="required"/>
    <!-- any content -->
</complexType>
<complexType name="b">
    <!-- any content -->
    <attribute name="a" type="string" use="optional"/>
    <!-- any content -->
</complexType>
```

With regard to upfront constraints, in one implementation, if required attributes have been changed into optional attributes, a corresponding xtl:attribute element must exist within the element that carried the required attribute:

context element complying to the complex type defining the attribute
inv:

```
let count : Integer =
    self->select(xtl:attribute)->
        select(@name='name of required attribute')->size( )
in
    if select(@name of required attribute)->isEmpty( )
        then count = 1 else count = 0
    endif
```

Furthermore, for all attributes that are of type ID, it must be enforced that they are set via xtl:attribute rather than directly if they are embedded into an xtl:for-each loop:

context element complying to the complex type defining the attribute
inv:

```
self->select(ancestor::*)->select(@for-each)->size( ) > 0
    implies
    (self->select(@attribute name)->isNull( )
        and
    self->select(xtl:attribute[@name='attribute name')->size( ) = 1)
```

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalent terms or equivalent processes, systems, or configurations of the features shown and described, or portions thereof, it being recognized that various modifications are possible within the scope of the appended claims.

What is claimed is:

1. A computer-implemented method for validating a template comprising:
   receiving a target language schema;
   receiving a placeholder language schema;
   generating a template schema that is based on the target language schema and the placeholder language schema;
   validating the template against the template schema, wherein the template includes placeholders, and wherein the placeholder language schema constrains placeholders in the template; and
   instantiating the template, after the template is validated, to produce a document if the template conforms to the template schema
   wherein the template schema comprises one or more upfront constraints and one or more instantiation constraints, wherein the upfront constraints are imposed upon the template during validation of the template before an instantiation, and wherein the instantiation constraints are imposed upon the template during the instantiation.

2. The method of claim 1 wherein if the template conforms to the template schema and if the template is instantiated, the instantiated template will conform to the target language schema.

3. The method of claim 1 wherein the template schema is an Extensible Markup Language (XML) schema.

4. The method of claim 3 wherein the XML schema is enhanced using an object constraint language.

5. The method of claim 1 wherein the target language schema contains constraints, and wherein all of the constraints of the target language schema are preserved in the template schema.

6. The method of claim 1 wherein generating the template schema comprises transforming simple types into complex types.

7. A computer system comprising:

at least one computer;

a schema compiler, executing on said at least one computer, for generating a template schema based on a target language schema and a placeholder language schema;

a template validator, executing on said at least one computer, for validating the template against the template schema, wherein the template includes placeholders, and wherein the placeholder language schema constrains placeholders in the template; and a template engine, executing on said at least one computer, for instantiating a template, after the template is validated, to produce a document if the template conforms to the template schema, wherein the template schema comprises one or more upfront constraints and one or more instantiation constraints, wherein the upfront constraints are imposed upon the template during validation of the template before an instantiation, and wherein the instantiation constraints are imposed upon the template during the instantiation.

8. The computer system of claim 7 wherein if the template conforms to the template schema and if the template is instantiated, the instantiated template will conform to the target language schema.

9. The computer system of claim 7 wherein the template schema is an Extensible Markup Language (XML) schema.

10. The computer system of claim 9 wherein the XML schema is enhanced using an object constraint language.

11. The computer system of claim 7 wherein the target language schema contains constraints, and wherein all of the constraints of the target language schema are preserved in the template schema.

12. The computer system of claim 7 wherein the compiler transforms simple types into complex types.

13. A non-transitory computer-readable storage medium containing instructions for controlling a computer system to perform a method for validating a template, the method comprising:

receiving a target language schema;

receiving a placeholder language schema;

generating a template schema that is based on the target language schema and the placeholder language schema;

validating the template against the template schema, wherein the template includes placeholders, and wherein the placeholder language schema constrains placeholders in the template; and instantiating the template, after the template is validated, to produce a document if the template conforms to the template schema, wherein the template schema comprises one or more upfront constraints and one or more instantiation constraints, wherein the upfront constraints are imposed upon the template during validation of the template before an instantiation, and wherein the instantiation constraints are imposed upon the template during the instantiation.

14. The computer-readable storage medium of claim 13 wherein the target language schema contains constraints that are imposed on the template, and wherein all of the constraints of the target language schema are preserved in the template schema.

15. The computer-readable storage medium of claim 13 wherein the template schema is an Extensible Markup Language (XML) schema.

16. The computer-readable storage medium of claim 15 wherein the XML schema is enhanced using an object constraint language.

17. The computer-readable storage medium of claim 13 wherein the template schema generating comprises transforming simple types into complex types.

* * * * *